D. HIGHAM.
TALKING MACHINE RECORD AND METHOD AND APPARATUS THEREFOR.
APPLICATION FILED JUNE 11, 1920.

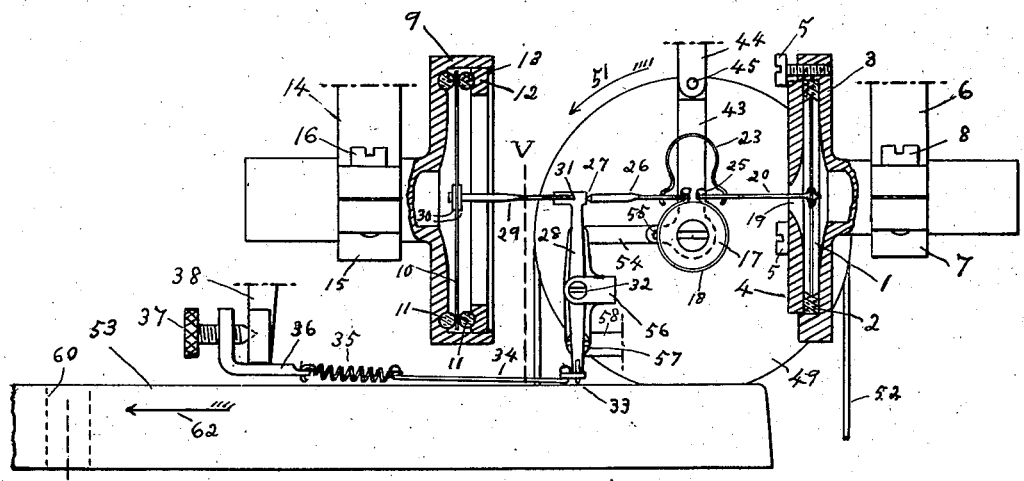

1,414,185.

Patented Apr. 25, 1922.
2 SHEETS—SHEET 2.

INVENTOR
DANIEL HIGHAM
BY
Howson and Howson
his ATTORNEYS

UNITED STATES PATENT OFFICE.

DANIEL HIGHAM, OF EAST ORANGE, NEW JERSEY.

TALKING-MACHINE RECORD AND METHOD AND APPARATUS THEREFOR.

1,414,185.  Specification of Letters Patent.  Patented Apr. 25, 1922.

Application filed June 11, 1920. Serial No. 388,315.

*To all whom it may concern:*

Be it known that I, DANIEL HIGHAM, a citizen of the United States of America, residing at East Orange, in the county of Essex and State of New Jersey, have invented new and useful Improvements in Talking-Machine Records and Methods and Apparatus Therefor, of which the following is a specification.

This invention relates to recording of sound waves for a talking machine record, and its object is to so provide for this recording that the distortions ordinarily made in recording and reproducing sound waves can be correctly compensated for.

With present recording means and methods, the amplitude of the recorded sound wave is reduced in amount by the opposing action of the recorder diaphragm, and the lower the pitch with relatively greater amplitude of the sound wave, the greater the ratio of this reduction of amplitude of the recorded sound waves will be, compared to the original sound waves.

With talking machine reproducers now in use, the fulcrumal resistance for the transmission of the recorded sound wave vibration to the diaphragm of the reproducer is inertia only of the reproducer as a body; whereby a wave vibration of the reproducer body takes place, which acts to increase the amplitude of a continued sound wave vibration of given pitch, and the lower the pitch of the recorded sound wave the greater the ratio of this increased amplitude of the reproduced sound wave will be, compared to the recorded sound wave.

In this way, distortions made by the recorder diaphragm, and distortions made by the inertia fulcrum of the reproducer, act to offset each other to a very great extent, in fact a simple sustained sound wave may be recorded throughout several octaves and reproduced in the exact relative amplitudes of the original by this balancing-up of the present recorder for the present reproducer; but for compound vibrations such as produced by a string or hammer-blow type of musical instrument, the fundamental will be the only vibration to follow such balance, for the reason that the recorder diaphragm acts to reduce the amplitude of an overtone vibration precisely as much as it does when that vibration is a fundamental, whereas the reproducer will relatively increase the amplitude of that vibration only when it is the fundamental or lowest vibration taking place at that instant.

Furthermore, the first half wave start of a continued sound wave vibration is always reduced in amplitude and reduced in length by both present recorder and present reproducer, while the continuation is always advanced in phase. In other words, there is always a discrepancy in present "balancing" up of the recorder and reproducer, because they are not a complete inverse of each other.

Now I propose to compensate for the distortions of the present reproducer by recording a complete inverse of the reproducer distortions for the talking machine record. This I accomplish by making the recorder means actuate a reproducer means at the time of recording through an amplifying means, and by making that means movable a vibration of the same will be set up proportional to the amount of inertia of that body, whereby the recording stylus lever can be fulcrumally supported by that inertia-resisted body, and the vibrations of the same will act to distort the sound wave vibrations transmitted from the recorder or sound-receiving diaphragm to the exact inverse of the distortions made by the present talking machine.

Or more specifically, by my method of balancing up the recorder and reproducer distortions, the first half wave of a sound wave vibration of given pitch will be recorded with an exaggerated increase of amplitude and length while the continuation of that wave will be recorded with reduced amplitude and lagged in phase; whereby the present reproducer, acting to reduce the amplitude of the first half wave and decreasing its length and acting to increase the amplitude and advance the phase of a continued recorded sound wave, will distort to reproduce the exact original sound wave character.

In order to make my invention clearly understood, reference will be made to the accompanying drawings, of which Fig. 1 is a side elevation, partly in section, of means for carrying my method of recording into effect;

Fig. 2 is a view, partly in section, looking from the left of Fig. 1 with certain parts removed from the left of the dash line V;

Fig. 3 shows a portion partly in section;

Figure 6:
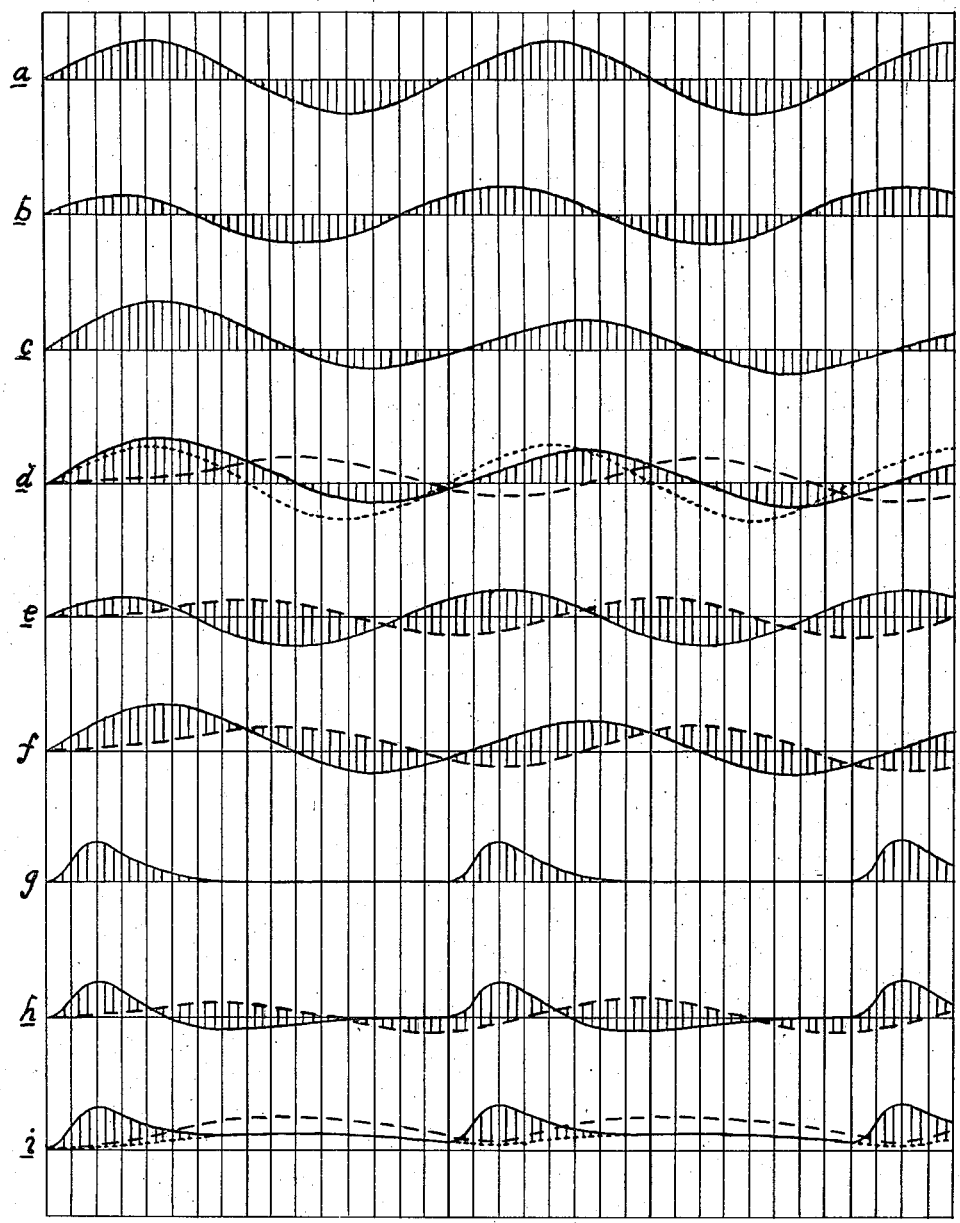

Fig. 4 a part in another view;

Fig. 5 is a diagram showing a different position of parts of Fig. 1; while

Fig. 6 graphically shows the performance of my method of recording as distinguished from present recording, and the distinguishing performance of each when operating the present reproducer.

In the means shown, 1 is a usual recorder diaphragm, but held at its extreme periphery by a soft rubber ring 2 having a V-shaped groove moulded in its inner circumference and adjustably clamped in a casing 3 by a cap 4 with screws 5. The extended end of the casing 3 is for connection with a suitable recording horn and is adjustably clamped in a support 6 by a cap 7 and screws 8. The casing 9 is provided with a sound reproducing diaphragm 10, held between rubber gaskets 11 by a ring cap 12 fixed in position by a wax fillet 13. The extended end of the casing 9 is for connection with a suitable reproducing horn, and is adjustably clamped in a support 14 by a cap 15 and screws 16.

A friction rotor 17 and a friction band or cord 18 constitute means for amplifying the power of the sound vibrations. Passing through an opening 19 in cap 4 is a connecting piece 20 having a small finger 21, shown in Fig. 4, which passes through diaphragm 1 and is waxed therewith. This piece 20 has a small hole 22 in which a loop spring 23 engages, and two fingers 24 between which the friction cord 18 with a knot 25 engages.

In like manner, the flattened end of a round connecting piece 26 engages with the opposite end of the friction cord 18 and loop spring 23; the round end of piece 26 is provided with a center point 27 which seats in a center spot in the lever arm 28. The connecting piece 29 passes through diaphragm 10 and is fixed therewith by wax between small disks 30. The flattened end of 29 freely fits in a slot 31 of the lever arm 28, but is securely fixed therein by wax, when in proper position. The lever 28 is pivoted between center pointed screws 32 (Fig. 2), and carries a usual sapphire recording point 33 which passes through its lower end and is secured by shellac in proper position. A cord 34 (Fig. 1) also passes through this lower portion of the lever 28 and is fixed thereto by a knot in said cord and is likewise secured in the hooked end of a spring 35 having connection with an adjustable frame portion 36 provided with a pivoted screw 37 set in a center spot of a support 38.

The friction rotor 17 of the amplifying means is fixed to a shaft 39 (Fig. 2) between a shoulder 40 thereon and a screw 41, as shown in Fig. 3, a groove 42 being employed to guide the friction band 18. A swinging bearing hanger 43 for the shaft 39 is freely pivoted to a support 44 by a pin 45, and the opposite end of the shaft 39 is provided with a ball-shaped bearing in a support 46 having a suitable cap 47 and screw 48. A pulley 49, fixed to shaft 39 by a pin 50, is rotated in the direction of the arrow 51 (Fig. 1) by a belt or cord 52 from the same source of motive power which rotates the wax recording blank 53. A link 54 through which pins 55 (Figs. 1 and 2) freely pass, connects the swinging bearing 43 with a frame 56 carrying the before mentioned center pointed screws 32 which support the recording lever 28. The frame 56 also carries center pointed screws 57, which seats in center spots in a support 58. The recording blank 53 is supported, centered at its bore 60, rotated about its axis 61 in the direction of arrows 62, and advanced so that the axis 61 travels directly towards the recording sapphire 33, to scribe the usual spiral recording groove, all by usual means.

The recording blank 53 may be shaved true in the same supporting means by suitable rotating means, with the usual sapphire shaving knife supported as near the recording sapphire 33 as possible. The desired depth of recording groove is made by adjustment of the frame of the recording means relatively to the recording blank, by usual means. The friction rotor 17 may be of any suitable metal, (preferably not easily corroded) if the friction band or cord 18 has been soaked in a thin solution of glue and water, and dried. This serves to effect a proper co-efficient of friction, providing about the average or proper degree of humidity is maintained in the recording room. Or the friction rotor 17 may preferably be made of amber, say inside the dotted lines on each side of the guiding groove 42 shown in Fig. 3, while the portions outside the dotted lines may be of metal to effect the necessary amount of inertia resistance of that swinging body, or it may be further increased if need be by a suitable inertia collar 63, which may be fixed to the shaft 39 by a set screw 64. With the amber rotor, humidity is not important, and the increase of the power (not the amplitude) of the sound vibration transmitted from diaphragm 1 to the recording lever 28 and reproducer diaphragm 10, may be sixty times. The diameter of the friction rotor 17 should be about three-eighths of an inch, and it should be rotated at about 160 revolutions a minute, and its rate of rotation should be substantially an exact factor relatively to the number of revolutions of the recording blank 53, which is usually 80 revolutions per minute. This is important in order that any slight irregularity in the action of the friction rotor 17, resulting in a synchronous movement of the recording lever 28, will be made to occur at each half revolution of the blank 53 and therefore not interfere with the proper spacing of the recording groove.

Fig. 5 diagrammatically shows the required disposition of the lever arrangement of movable parts as viewed in Fig. 1. The dots indicate the pivotal points, but the dots emphasized with small circles indicate pivoted points upon a fixed support, while the lines connecting the different points indicate the parts designated by same figures of reference in Fig. 1. From this it will be seen that if the friction rotor 17 were fixed from any movement about the axis and the friction band 18 were prevented from movement about its circumference, a movement of the swinging hanger 43, made by hand for instance, would bend both diaphragms 1 and 10 as indicated, but would not move the sapphire point 33 from the line indicated by dots. It will also be evident from this disposition of parts that the action of the spring 35 in Fig. 1 will be nil in exerting pressure upon either diaphragm 1 or diaphragm 10 when the rotor 17 is in motion.

The proper operation of the means shown and described is brought about in the following manner: The screws 5 are carefully adjusted to compress the rubber ring 2 sufficiently to just compress the circumference of diaphragm 1 to the critical point of making a flip-flop action for the same, but at the same time absolutely without that action. This adjustment makes diaphragm 1 slack in the middle and destroys all elastic diaphragm action, required for present recording, within the limit of amplitude permitted by the recording space. The cap 4 with its suitable opening 19, determined by experiment, offers air resistance to the sound vibrations of diaphragm 1, and compels the vibrations of the same to be undistorted in character from the original sound waves. That is, the resistance offered by air in this manner tends to lag the phase of the vibrations of diaphragm 1, but this same resistance being also against the air vibration of the source, causes dissipation of the air vibration in front of the recording horn which tends to advance the phase of the vibrations of diaphragm 1, therefore both actions result only in reduction of amplitude without distortion of character from the original sound wave. The distortive action of the reproducer diaphragm 10, however, is essential for the correct performance of this method of recording, but the same must not be imposed against diaphragm 1. This is accomplished by the friction amplifying means in giving the necessary vibrating power to the movements of diaphragm 10 but only resisting the vibrations of diaphragm 1 by 1/60 of that amount. In this way vibrations of diaphragm 1 will only be slightly opposed; but owing to the full force of the amplifying means acting to vibrate the diaphragm 10 of the reproducer element, and the swinging support 43 offering no fulcrumal resistance for the transmission of the sound vibrations from the friction means to diaphragm 10, excepting inertia of the swinging parts, the resultant wave vibrations of the swinging parts are compelled to be transmitted to the fulcrumal support of the recording lever 28, whereby the correct sound vibrations transmitted to the upper end of the recording lever 28 will combine with the said fulcrumal vibrations to effect resultant vibrations of the sapphire recording point 33 which will distort the recorded sound waves invertedly to the distortions effected by fulcrumal inertia resistance of the present reproducer, in order that the present reproducer will distort to the exact original sound character.

In order to more fully bring out the distinguishing characteristics between my method of recording and the present recording method, and their distinguishing performances in reproducing, I shall make reference to the graphic performances depicted in Fig. 6. These performances are lettered $a$, $b$, $c$, $d$, $e$, $f$, $g$, $h$ and $i$, and each one is plotted so that the same point of time is carried from one to the other by the same ordinate line, while the equal spaces of the ordinate lines indicate equal duration of time. The straight line in each plotting indicates the normal position of vibrating parts, while the length of the small ordinate lines in each plotting indicates the amount of amplitude at that particular instant. The plot $a$ is a simple sine wave which will be assumed to be the original sound wave character with its inception at the first ordinate line to the left. Plot $b$ is the approximate sound wave character which will be recorded by existing recorders from the original wave character $a$.

Plot $c$ is the character of sound wave which will be recorded in accordance with my method of recording from the original sound wave character $a$.

A comparison of the distorted recorded sound wave $b$, due to elastic resistance of the recorder diaphragm, and the invertedly distorted wave $c$ recorded by my method of recording, will clearly show the marked distinction of the latter by the greatly increased amplitude and length of the first half wave as compared to the greatly reduced amplitude and length of the first half wave of the former. It will also be seen that the wave shown by plot $b$ is not a true sine wave, which is due to the elastic diaphragm resistance of the present recorder being greatest at the tip and trough of the wave.

Plot *d* shows by the line of dots the undistorted wave of diaphragm 1 of my means of recording, and shows by the line of dashes the wave effected by the inertia resisted swinging parts of the amplifying means, which actions both combine to record the wave character shown in the full line, or to record the wave shown in plot *c*. Plot *e* shows by the full line the wave shown in plot *b* as recorded by known methods, and shows by the line of dashes the wave effected by the inertia-resisted fulcrumal body of the present reproducer, while the lengths of the small ordinate lines indicate the amount of the reproduced amplitude. From this it will be seen that the first half wave is greatly sacrificed while the whole wave action is advanced in phase relatively to the original sound wave *a*.

Plot *f* shows by full line the wave effected by my method of recording shown in plot *c* and shows in dashes the wave effected by the inertia-resisted fulcrumal body of the present reproducer. From this it will be seen that the length of the corresponding small ordinates are precisely the same as with the original sound wave character shown in plot *a*. The wave effected by the inertia-resisted fulcrumal body of the reproducer ordinarily used is not only lagged one-quarter wave length in phase by inertia action, but the elastic resistance of the reproducer diaphragm being greatest at the tip and trough of the wave acts to make the wave effected by the fulcrumal body of the reproducer lag one-half wave length, because both are non-dissipative actions, but the dissipative resistance offered by air against the diaphragm vibrations prevents a half-wave lag and results in a lag somewhere between one-quarter and one-half wave length, according to the pitch of the sound vibration, as indicated by the dash line waves.

In plot *g* I have shown a puff character of sound impulses, which may be representative of the fundamental character of a voice note, of a cornet note, or the note of any wind type of musical instrument, and which will be assumed to be the original character of the puff impulses. The direction of the puffs above the normal line will be assumed to be towards the ear, and will be referred to as a positive impulse.

Plot *h* shows by full line the distortion from the original impulse effected by recorder at present used, and the line of dashes indicates the wave effected by the inertia-resisted fulcrumal body of the present reproducer, while the lengths of the small ordinates indicate the amount of amplitude reproduced. From this it will be seen that while the original plot *g* shows only positive impulses, the plot *h* shows both positive and negative impulses constituting the same pitch, but effecting exaggerated loudness with great distortion of character.

Plot *i* shows by the full line the sound impulses shown in the original plot *g* as distorted in accordance with my method of recording by the inertia-resisted swinging parts of the amplifying means acting as indicated by the dotted line, while the dash line shows the wave effected by the inertia-resisted fulcrumal body of the present reproducer. From this it will be seen that the ultra positive action effected by my method of recording shown by the full line above the normal line, will be exactly compensated for by the action of the reproducer in effecting an equal negative action below the dash line, whereby the actual reproduced impulse character will be precisely the same as the original character depicted in plot *g*, as indicated by the small ordinate line in each of the *g* and *i* plots.

With some makes of talking machine records the first half wave action shown in plot *e* is recorded, so that the reproducer at present in use effects a negative action for same in order to make the first prominent half wave effect the positive action; but with my method of recording the positive action of the original must be recorded to be reproduced as a positive action.

It will be impracticable to enter into a discussion of complex sound waves in this disclosure, but it should be clearly understood, if the first half wave of a simple sound wave can be reproduced relatively to the continuation of the same that any complexity of sound wave vibrations within the range of recordability can be reproduced in their exact relative values by a record produced by my method of recording. With present recording, however, the more complex the sound vibrations the more continuously will the first half wave distortive action be taking place, and the more concerted the sound vibrations, such as produced by orchestra or band, the more difficult will it be to distinguish a stringed instrument from a brass instrument; but with my method of recording the sound of each instrument will at all times be reproduced with the characteristics of each instrument.

With present recording the elastic action of the recorder diaphragm being non-dissipative, that is acting to give back the energy stored up in its elastic resistance, often develops into an explosive vibration known in the art as a "blast", which may vibrate beyond the limit of the recording space. With my method of recording, however, this is impossible, for the reason that the elastic diaphragm action is not only destroyed, but the recorder diaphragm is also subjected to the dissipative action of air resistance; while the "blast" tendency of the present reproducer is completely overcome by recording with a reproducing element acting invertedly, namely, instead of the "blast" action resulting in a vibration beyond the recording space it will tend to bring the same to zero amplitude, as indicated by the action illustrated in Fig. 5.

Manifestly, any talking machine record, to exactly compensate for distortions of the present talking machine reproducer, must be recorded with those distortions exactly inverted in accordance with my herein disclosures.

The amplifying means shown and described in this application are old in the art of amplifying sound vibration and I desire it to be understood that my invention may be used in connection with other amplifying means.

I claim as my invention:—

1. A method for recording a talking machine record, said method consisting of distorting through the action of suitable amplifying means the recorded sound wave inversely to the distortions effected in amplitude and phase by the talking machine reproducer, for the purpose described.

2. The method herein disclosed for recording a talking machine record, said method consisting of distorting through the action of suitable amplifying means the recorded sound waves by inertia-resisted vibrations inversely to the distortions effected by inertia-resisted fulcrumal vibrations of the reproducer, for the purpose described.

3. A talking machine record having the recorded sound waves with distortions inverted to the distortions effected in amplitude and phase by the talking machine reproducer.

4. A talking machine recording apparatus provided with suitable amplifying means in combination with inertia-resisted vibrating means acting to record a complete inverse of the distortions normally produced by a talking machine reproducer.

5. A talking machine recording apparatus comprising a recording element, a reproducing element, and suitable amplifying means in combination with inertia-resisted vibrating means whereby the distortions of the reproducer element will be transmitted inversely to the recording element.

In testimony whereof I have signed my name to this specification.

DANIEL HIGHAM.